Dec. 8, 1959

R. H. MILLER ET AL 2,916,096

REVERSIBLE DISK PLOW

Filed April 19, 1956

Inventors
Robert H. Miller
Gerald G. Ward

Paul O. Pippel
Attorneys

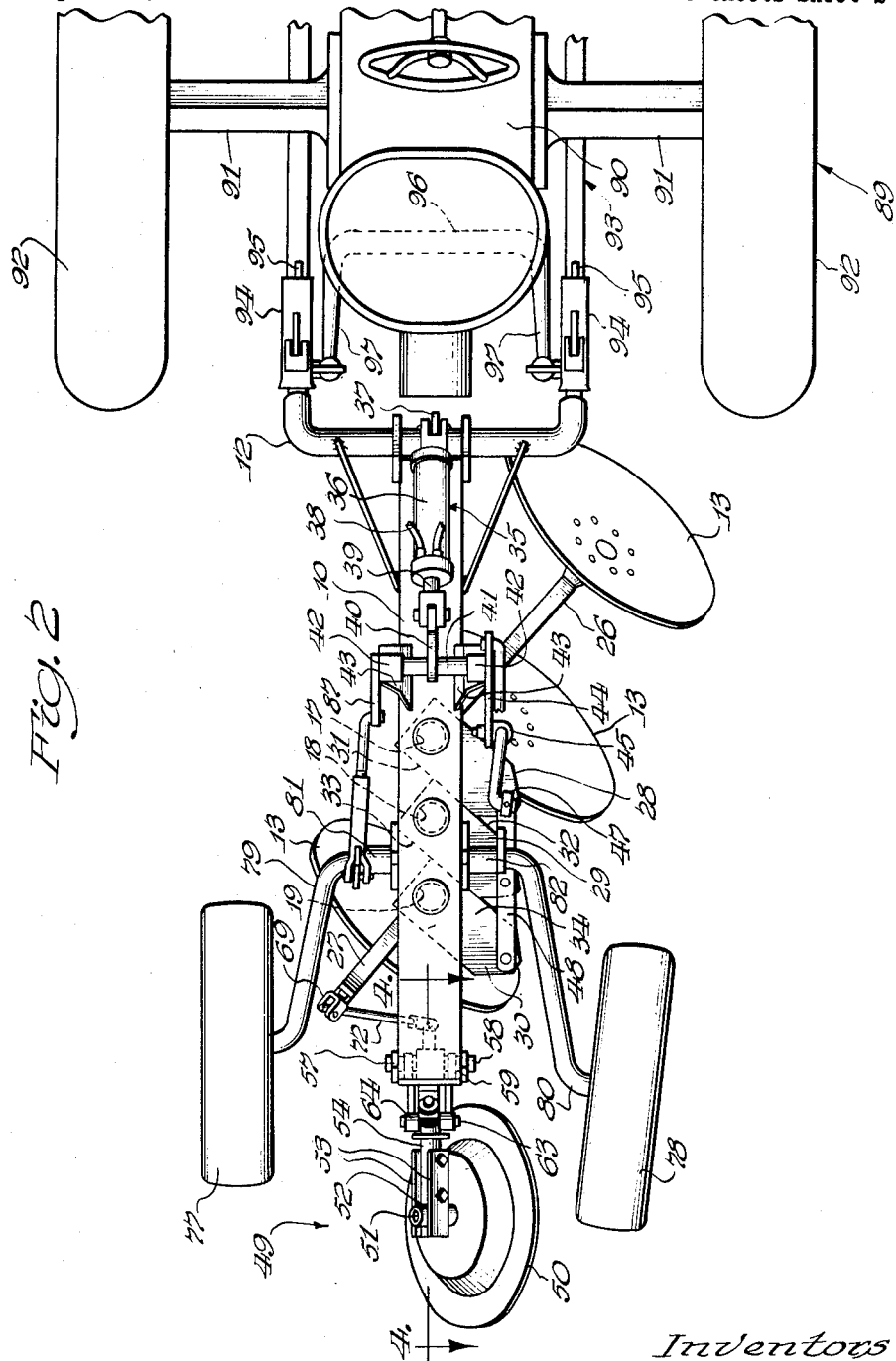

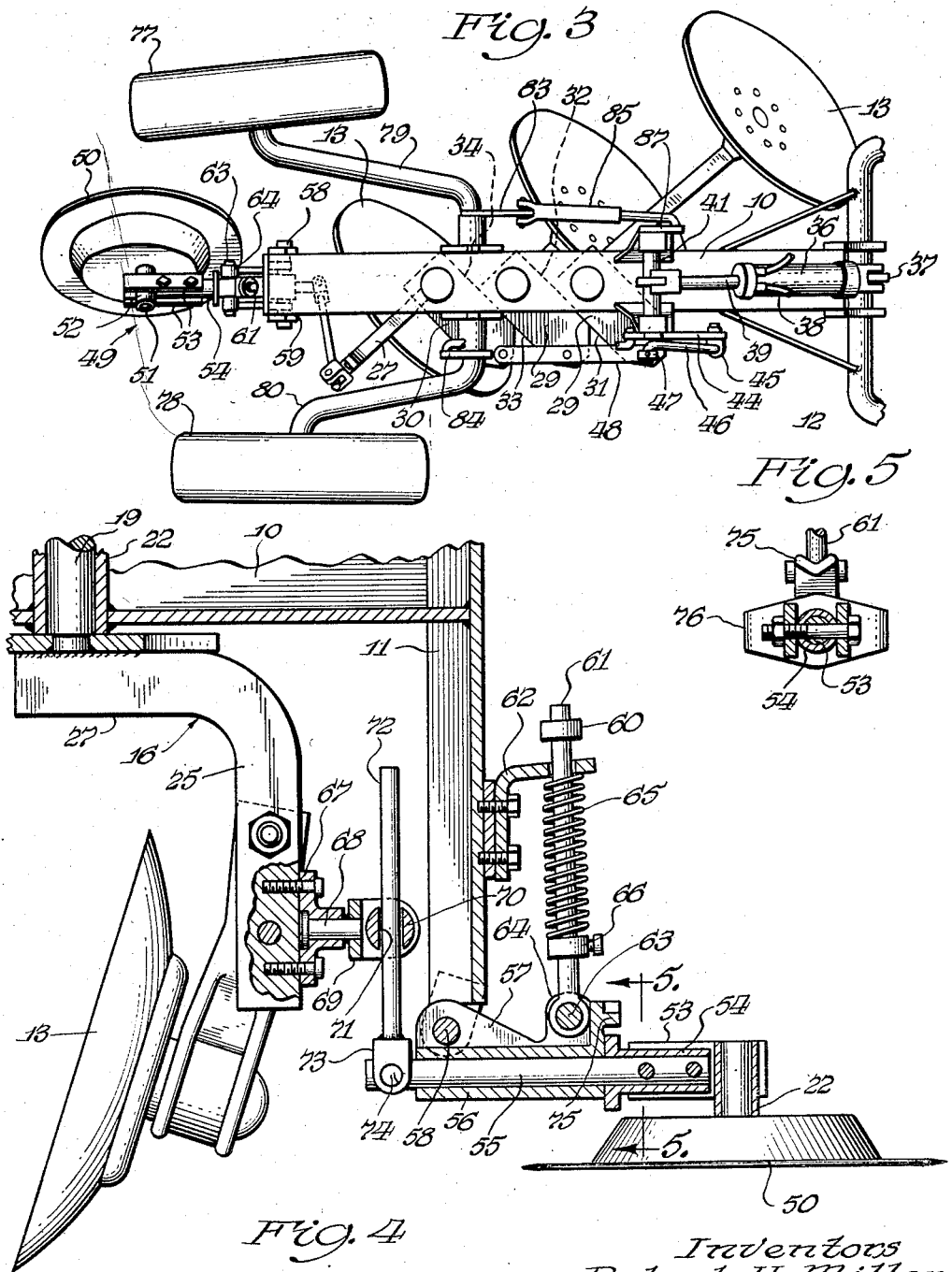

United States Patent Office 2,916,096
Patented Dec. 8, 1959

2,916,096

REVERSIBLE DISK PLOW

Robert H. Miller and Gerald G. Ward, Memphis, Tenn., assignors to International Harvester Company, a corporation of New Jersey Application April 19, 1956, Serial No. 579,269

4 Claims. (Cl. 172—212)

This invention relates to reversible disk plows and particularly to novel and improved means for mounting a disk gang on a supporting frame for lateral swinging between right and left-hand plowing positions. More specifically, the invention concerns a novel disk gang and a furrow wheel arrangement wherein means are provided for moving the furrow wheel alternately between two positions corresponding to the alternate positions of the disk gang.

An object of the invention is the provision of a novel disk plow and rear furrow wheel combination wherein the disks are individually mounted on a supporting frame for rotation about separate axes to alternately dispose the disk gang for right and left-hand plowing, and wherein a connection is made between one of the disk supporting means and the furrow wheel operative to automatically adjust the position of the latter in response to movement of the disk gang.

Another object of the invention is the provision, in a reversible disk plow, of novel means for mounting the wheel on a supporting frame and controlling its position automatically in response to reversing of the disks.

Other objects and advantages of the invention will become clear from the following detailed description when read in conjunction with the accompanying drawings wherein:

Figure 2 is a plan view of the structure shown in Figure 1, with the gang of disks arranged on the right-hand diagonal;

Figure 3 is a plan view of the plow structure shown in Figure 2, with the gang of disks arranged in its alternate operating position for left-hand plowing;

Figure 4 is an enlarged section taken on the line 4—4 of Figure 2, but with the movable parts shown about halfway between the two operating positions; and Figure 5 is a section taken on the line 5—5 of Figure 4.

Figure 1:
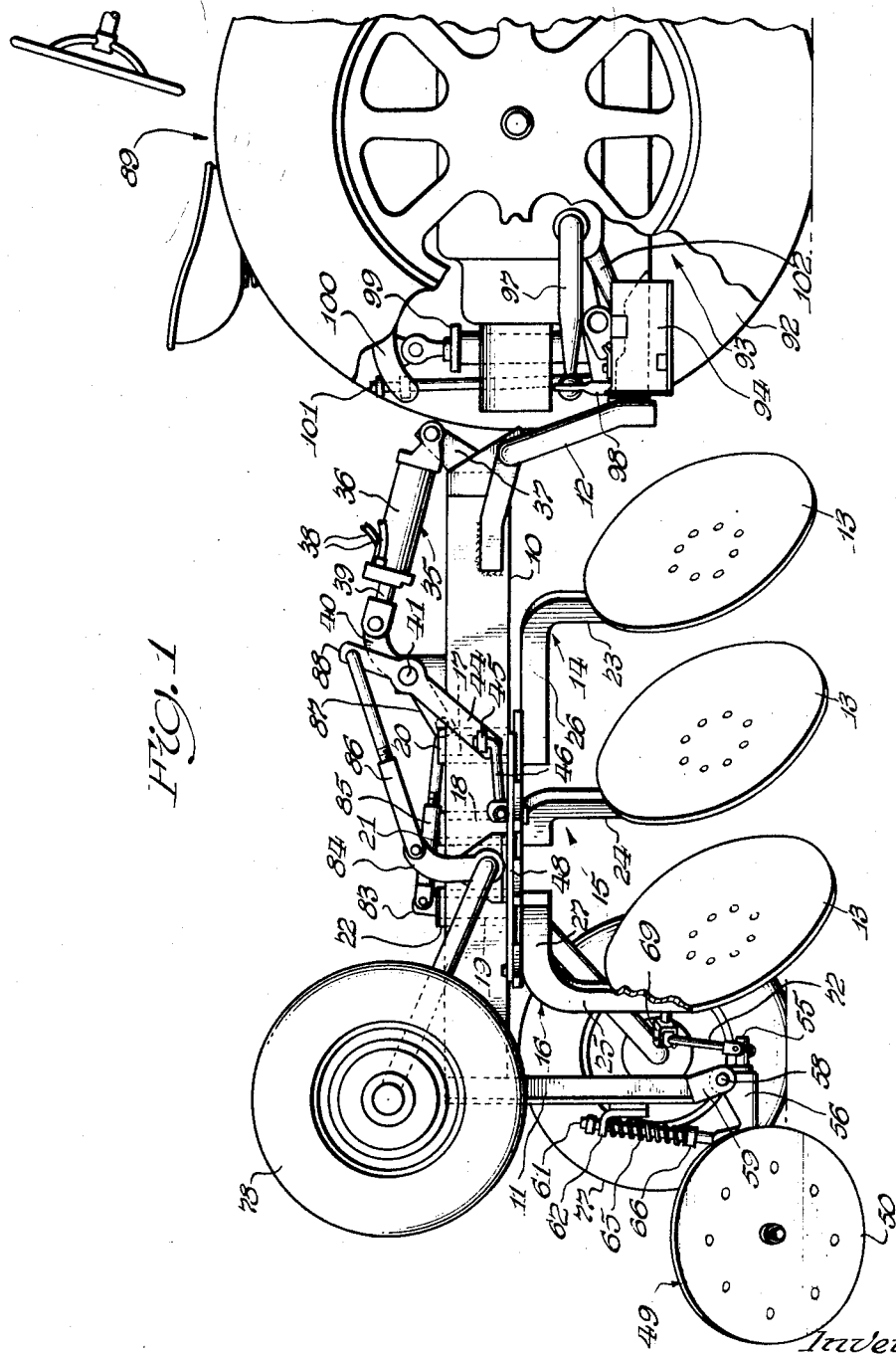
Figure 1 is a view in side elevation of the rear end of a tractor, with parts removed for clarity, having a reversible disk plow mounted thereon embodying the features of this invention.

Referring to the drawings, the reversible disk plow of this invention comprises a longitudinally extending box section frame 10 having a depending, vertically extending frame section 11 affixed to its rear end and at its forward end a bail-like hitch member 12.

The plow of this invention is a three-disk plow and the disks, designated by the numeral 13, are carried by longitudinally spaced tool beams 14, 15 and 16, which includes vertical spindle portions 17, 18 and 19, respectively. Spindle portions 17, 18 and 19 of the tool beams are arranged in longitudinal alignment in the main supporting frame 10 and are rotatably mounted in bearings 20, 21 and 22 carried by the supporting frame.

Tool beams 14, 15 and 16 also include vertically extending upright disk-carrying portions 23, 24 and 25, respectively. In the case of the central beam 15, the vertical disk-carrying portion 24 is affixed to the associated spindle portion 18 at a point closely adjacent the latter so that rotation of spindle 18 causes disk 13 to swing laterally on a relatively short radius about the axis of the spindle 18, the two operating positions of the central disk 13 being shown in Figures 2 and 3.

The disk-carrying vertical portion 23 of forwardmost tool beam 14 is bent horizontally to provide a relatively long lever arm 26 to which the vertical spindle 17 is affixed, and in Figure 2 lever arm 26 is shown as extending forwardly and outwardly diagonally of the direction of travel of the tractor and plow, with the associated disk 13 on the right-hand side of plow frame 10 and in general diagonal alignment with the central disk 13.

The vertical disk-carrying portion 25 of the rearmost tool beam 16 is also bent horizontally to form a lever arm 27 which is affixed to the rearmost spindle 19 and extends rearwardly and laterally outwardly from the left side of frame 10 opposite lever arm 26 for the foremost tool beam and parallel thereto, rearmost disk 13 thus being generally in alignment with the two forward disks.

The disks 13 form an aligned gang of disks shown in Figure 2 as operating on the right-hand diagonal for right-hand plowing. Simultaneous lateral swinging of the disks and tool beams about their respective axes on the plow frame from the right-hand plowing position of Figure 2 to the alternate, left-hand plowing position of Figure 3 with the disks in alignment on the opposite diagonal is accomplished by the provision on spindles 17, 18 and 19 of rectangularly shaped plate-like levers 28, 29 and 30, each of which is affixed to its associated spindle below frame 10 and projects laterally from the right-hand side thereof.

During swinging of the levers 28, 29 and 30, in order to reverse the position of the disk gang, the levers become separated. However, in order to limit the extent of lateral movement of the disk gang the adjacent edges 31 and 32 of adjacent levers 28 and 29 and adjacent edges 33 and 34 of adjacent levers 29 and 30, serve as abutments or stops when they come into engagement to limit the lateral swinging thereof. During swinging of the disk gang from the right-hand plowing position of Figure 2 to the alternate or left-hand plowing position of Figure 3 the levers 28, 29 and 30 again becomes separated until the parts reach the position shown in Figure 3 with the adjacent edges of the levers again serving a stops to limit the lateral swinging of the gang.

Lateral swinging of the levers 28, 29 and 30 to reverse the disks is accomplished by power operated mechanism in the form of a hydraulic ram 35 comprising a cylinder 36 anchored to a bracket 37 affixed to hitch member 12 and supplied with fluid under pressure through hose lines 38 receiving fluid from a pressure source on the tractor, not shown. A piston 39 slidable in the cylinder 36 is pivotally connected to an arm 40 mounted upon a rockshaft 41, the ends of which are supported in bearings 42 carried by brackets 43 affixed to and projecting upwardly from frame 10.

One end of shaft 41 has affixed thereto a depending arm 44 having a swivel 45 mounted at its lower end. Swivel 45 pivotally receives the bent end of a link 46, the other end of which is pivotally received in a swivel 47 mounted at one end of a strap 48, which extends across and is pivotally connected to each of the levers 28, 29 and 30. Thus by operation of ram 35, shaft 41 and arm 44 are rocked, acting through link 44 and strap 48 to swing the lever arms 28, 29 and 30 in opposite directions to dispose the disk gang in its alternate operating positions.

In order to offset side draft on the plow during operation it is necessary to provide a rear furrow wheel unit 49. This unit comprises a furrow wheel 50 mounted upon a stub shaft 51 rotatable in a bearing 52 secured between a pair of straps 53 affixed to a longitudinally extending sleeve 54 in which is secured a shaft 55. Shaft 55 extends forwardly and is rotatably received in another sleeve 56 provided with ears 57 in which is mounted a pin 58 received in openings in a pair of lugs 59 affixed to the lower end of the upright frame portion 11. Thus the furrow wheel 50 is capable of vertical swinging about a transverse axis represented by the pin 58, and this movement is limited in a downward direction by a collar 60 on the end of a rod 61 slidably received in an opening provided in a bracket 62 mounted on the frame 11. The lower end of rod 61 is pivotally mounted upon a pin 63 carried by a pair of lugs 64 forming a part of sleeve 56. Upward movement of the wheel 50 is resisted by a coil spring 65 surrounding rod 61 and abutting bracket 62 at one end and a collar 66 at its other end.

Furrow wheel 50 is a common furrow wheel effective to ride in the furrow made by the earth-working tools and to offset side draft against the plow in both operating positions thereof. For this purpose the furrow wheel 50 must be shifted from the position shown in Figure 2 for right-hand plowing to the position shown in Figure 3 for left-hand plowing. To accomplish this, use is made of the rear tool beam 16 and particularly the arc of movement of the tool-carrying upright portion 25 of the beam as it swings from one side to the other of the longitudinal axis of the supporting frame 10. For this purpose the lower end of the upright beam portion 25 has mounted thereon a bearing member 67 rotatably carrying a pin 68 to which is affixed a swivel 69 in which is mounted a pin 70 provided with an opening 71 to slidably receive an elongated rod 72, the lower end of which has affixed thereto a clevis 73 pivotally mounted upon a pin 74 carried in the end of shaft 55. Thus as the disk gang moves from one operating position to the other, the shaft 55 and therefore furrow wheel 50 are rocked from one operating position to the other, and this is accomplished by the lateral sweep of rear tool beam 16 as it swings from one side to the other.

Swinging of furrow wheel 50 from one operating position to the other as shown in Figures 2 and 3 is limited by the provision of a stop member in the form of a V-shaped abutment 75 at the rear end of sleeve 56 and engageable by the angled upper edges of a transverse bar member or projection 76 forming a part of sleeve 54.

Gauge wheels 77 and 78 are provided for alternate operation to alternately gauge the working depth of the disks in the alternate operating positions thereof, and are fully described in copending U.S. application Serial No. 579,270, filed April 19, 1956. As shown in Figure 1, while one of the gauge wheels is up, the other gauge wheel is down in operating position, and vertical swinging of the gauge wheels is accomplished in synchronism with the lateral swinging of the disk gang and of the furrow wheel. Briefly it may be noted that gauge wheels 77 and 78 are mounted upon crank axles 79 and 80 rockably received in bearings 81 and 82, respectively, carried by the plow frame 10. Rock arms 83 and 84 are affixed to the crank axles and are connected, respectively, by adjustable rods 85 and 86 to arms 87 and 88 affixed to opposite ends of shaft 41, arm 87 extending downwardly and arm 88 upwardly, as viewed in Figure 1. Rocking of shaft 41 thus serves to raise one of the gauge wheels and to lower the other.

Shifting of the plow units from one operating position to the other occurs when turning the tractor and implement at the end of the field for plowing in the opposite direction and these operations are accomplished with the implement in an elevated or transport position above the ground. The tractor on which the implement of this invention is mounted is designated by the numeral 89 and comprises a body 90, transverse rear axle structure 91 and laterally spaced rear drive wheels 92. A drawbar 93 is connected to the tractor in draft-receiving relation at a location not shown, and is provided with laterally spaced socket members 94, which form no part of this invention, and a further description of which may be had by reference to copending U.S. application Serial No. 338,651, filed February 25, 1953, now Patent No. 2,776,613. Sockets 94 are adapted to slidably receive and confine laterally spaced shaft members 95 affixed to and projecting forwardly from the bail-like hitch member 12 of the implement, forming an integral connection between the tractor and the implement.

Raising and lowering of the drawbar 93 and of the implement is accomplished by lifting mechanism including a transverse rockshaft 96 mounted on the tractor and having laterally spaced lift arms 97 at the ends thereof, the latter being connected by links 98 to the socket member 94. Vertical swinging of arms 97 is accomplished by a hydraulic ram 99 anchored at one end to the tractor and connected at its other end to a link 100, pivotally mounted on the tractor in a manner not shown and connected by a lift rod 101 to an arm 102 affixed to the rockshaft 96.

It is believed that the operation of the reversible disk plow and furrow wheel assembly of this invention will be clearly understood from the foregoing description. It should also be understood that the invention has been described in its preferred embodiment and that modifications may be made therein without departing from the spirit of the invention or the scope of the appended claims.

What is claimed is:

1. For use in a two-way disk plow of the type including a frame and a disk-carrying standard mounted on the frame for lateral swinging between alternate operating positions for right and left-hand plowing, a furrow wheel unit including a supporting member pivotally mounted on the frame for vertical swinging, axle means including a generally horizontal portion carried by said supporting member for rotation about a longitudinal axis and a laterally directed, wheel-carrying portion rotatable with said horizontal portion to laterally swing the wheel bodily between positions corresponding to the right and left-hand plowing positions of the disk, a lever member pivotally mounted on said horizontal axle portion and extending radially therefrom, and a member pivotally mounted on said standard and slidably receiving said lever, said lever member being swingable laterally by the lateral swinging of the disk-carrying standard to swing said furrow wheel about the axis of said horizontal axle portion.

2. For use in a two-way disk plow of the type including a frame and a disk-carrying standard mounted on the frame for lateral swinging between alternate operating positions for right and left-hand plowing, a furrow wheel unit including a supporting member pivotally mounted on the frame for vertical swinging, axle means including a generally horizontal portion carried by said supporting member for rotation about a longitudinal axis and a laterally directed, wheel-carrying portion rotatable with said horizontal portion to laterally swing the wheel bodily between positions corresponding to the right and left-hand plowing positions of the disk, and means effecting rotation of said horizontal axle portion to laterally swing the wheel comprising a lever extending radially from said horizontal axle portion and laterally swingable to rotate said horizontal axle portion, and a swivel member mounted on the disk-carrying standard and slidably receiving said lever to transmit the lateral swinging of the standard to the lever and said horizontal axle portion to laterally swing said wheel.

3. For use in a two-way disk plow of the type including a frame and a disk-carrying standard mounted on the frame for lateral swinging between alternate operating positions for right and left-hand plowing, a furrow wheel unit including a supporting member pivotally mounted on the frame for vertical swinging, axle means including a generally horizontal portion carried by said supporting member for rotation about a longitudinal axis and a laterally directed, wheel-carrying portion rotatable with said horizontal portion to laterally swing the wheel bodily between positions corresponding to the right and left-hand plowing positions of the disk, and means effecting rotation of said horizontal axle portion to laterally swing the wheel comprising a lever extending radially from said horizontal axle portion and laterally swingable to rotate said horizontal axle portion, and a swivel member mounted on the disk-carrying standard and slidably receiving said lever to transmit the lateral swinging of the standard to the lever and said horizontal axle portion to laterally swing said wheel, said lever being pivotally mounted on said horizontal axle portion to accommodate the vertical swinging of the furrow wheel unit.

4. The invention set forth in claim 3, wherein spring means connected between the frame and said wheel unit yieldably opposes vertical swinging thereof in one direction.

References Cited in the file of this patent

UNITED STATES PATENTS

| | | |
|---|---|---|
| 2,732,782 | Gurries et al. | Jan. 31, 1956 |

FOREIGN PATENTS

| | | |
|---|---|---|
| E9,268 | Germany | Mar. 22, 1956 |
| 665,663 | Great Britain | Jan. 30, 1952 |
| 275,320 | Switzerland | Aug. 1, 1951 |